United States Patent [19]
Roach et al.

[11] Patent Number: 5,416,480
[45] Date of Patent: May 16, 1995

[54] ANALOG INTERFACE CIRCUITS FOR PROCESS CONTROLLERS AND PROCESS MONITORS

[75] Inventors: Kevin V. Roach, Carver; David C. Littlejohn, Marshfield Hills; James G. Calvin, Halifax, all of Mass.

[73] Assignee: Interactive Process Controls Corp., Easton, Mass.

[21] Appl. No.: 225,234

[22] Filed: Apr. 8, 1994

[51] Int. Cl.[6] .................. H03M 7/00; H03M 1/00
[52] U.S. Cl. ...................... 341/61; 341/110; 341/141
[58] Field of Search ............ 341/61, 50, 110, 141, 341/123; 364/178

[56] References Cited

U.S. PATENT DOCUMENTS

| | | | |
|---|---|---|---|
| 4,694,244 | 9/1987 | Whiteside et al. | 341/109 X |
| 4,749,986 | 6/1988 | Otani et al. | 340/587 |
| 4,827,259 | 5/1989 | Murphy et al. | 341/123 |
| 5,010,507 | 4/1991 | Kenny | 341/61 X |
| 5,038,365 | 8/1991 | Belloc et al. | 341/61 X |
| 5,072,358 | 12/1991 | Lankford | 364/178 |
| 5,170,387 | 12/1992 | Groen | 341/61 X |
| 5,327,125 | 7/1994 | Iwase et al. | 341/61 |

OTHER PUBLICATIONS

Data Sheet for AD7893, LC[2]MOS 12-bit Serial 6 μs ADC, Analog Devices, 12 pages.

Primary Examiner—Sharon D. Logan
Attorney, Agent, or Firm—Wolf, Greenfield & Sacks

[57] ABSTRACT

An interface circuit for use with process controllers permits analog signals to be input to a process controller through a binary interface of the process controller and permits analog signals to be output from the process controller through the binary interface. The input analog signal is converted to a digital sample of N bits. An identification pulse and the N bits of the digital sample are transmitted to the process controller at a rate selected for compatibility with the scan time of the process controller. The process controller includes a software routine for recognizing the identification pulse and the N bits of the digital sample. An equivalent approach is used for outputting analog signals through a binary interface of a process controller. The interface circuit can include multiple channels for inputting or outputting multiple analog signals.

24 Claims, 9 Drawing Sheets

ANALOG INTERFACE CIRCUITS FOR PROCESS CONTROLLERS AND PROCESS MONITORS

FIELD OF THE INVENTION

This invention relates to interface circuits for process controllers and process monitors and, more particularly, to circuits for inputting analog signals to a process controller through a digital interface and for outputting analog signals from a process controller through a digital interface.

BACKGROUND OF THE INVENTION

Process controllers and process monitors are used in a wide variety of industrial, commercial and scientific applications. A process controller, which may include a microprocessor, receives one or more inputs from sensors and transducers that monitor a process. The process controller evaluates the inputs, determines any necessary action based on user defined criteria and outputs one or more signals for controlling the process. Process controllers may include a digital input card for inputting binary signals which represent the state of a switch, a limit sensor or other device having two states. A digital output card may provide binary output signals for controlling lamps, switches and other binary devices which are involved in controlling the process. In other instances, the process controller receives and transmits binary signals through a digital interface without separate input and output cards. A process monitor receives inputs from sensors and transducers but does not provide outputs for controlling the process.

In many cases, it is necessary to input analog signals to the process controller or process monitor in order to monitor continuously variable parameters, such as temperature, fluid level, pressure, pH, conductivity and the like. It may also be necessary to output analog signals for controlling such continuously variable parameters. Some process controllers can be used with optional analog interface cards. Analog interface cards typically handle four or more analog inputs or outputs and may have additional features, such as digital filtering and scaling of the analog signals. Such analog interface cards provide satisfactory performance, but are relatively expensive. The expense of an analog interface card is particularly undesirable when only one or two analog inputs are required and when the additional features of the typical analog interface card are not required.

Other process controllers do not provide analog input and output capability and operate with only binary inputs and outputs. It has not heretofore been possible to input analog signals to such process controllers or to output analog signals from such process controllers.

The input or output analog signal in a process control application may represent a slowly-varying parameter, such as temperature or fluid level, wherein significant changes occur in times on the order of seconds, minutes or longer. In prior art systems, it has been necessary to incur the expense of an analog interface card in order to monitor such slowly-varying parameters. It is desirable to provide an interface circuit for inputting an analog signal to a process controller or a process monitor without incurring the expense of a high performance analog input card. It is also desirable to provide an interface circuit for outputting an analog signal from a process controller without incurring the expense of a high performance analog output card.

SUMMARY OF THE INVENTION

According to a first aspect of the invention, an interface circuit for inputting an analog signal to process apparatus having a binary interface is provided. The interface circuit comprises means for converting the analog signal to a digital sample of N bits, and means for serially transmitting to the process apparatus on a single line of the binary interface an identification pulse followed by the N bits of the digital sample. The process apparatus has a scan time X for sampling inputs at the binary interface. The identification pulse is transmitted with a first pulse width that is at least 2X, and each bit of the digital sample is transmitted with a second pulse width that is at least 4X. Preferably, the first pulse width is equal to or greater than 3X, and the second pulse width is equal to or greater than 5X.

The means for converting may comprise an analog-to-digital converter, and the means for serially transmitting may comprise a microcontroller for temporarily storing the N bits of the digital sample. The interface circuit may include multiplexing means for sequentially supplying two or more analog signals to the analog-to-digital converter. In this embodiment, the microcontroller temporarily stores the digital samples representative of the two or more analog signals and may transmit the digital samples in parallel on separate lines of the binary interface or may transmit the digital samples representative of the two or more analog signals serially on a single line of the binary interface in a time-multiplexed manner.

The process apparatus may comprise a process controller or a process monitor. The process apparatus includes means for recognizing the identification pulse and the N bits of the digital sample. The time duration of the identification pulse is determined, and the presence of the identification pulse is established when the time duration of the identification pulse is within predetermined upper and lower limits.

According to another aspect of the invention, an interface circuit for conversion of a signal transmitted serially by process apparatus having a binary interface is provided. The signal includes an identification pulse followed by a digital sample of N bits representative of an analog value. The process apparatus has a scan time X for changing output values at the binary interface. The interface circuit comprises means for receiving the identification pulse followed by the digital sample of N bits. The means for receiving includes means for recognizing the identification pulse as having a first pulse width that is at least 2X, and for recognizing each of the N bits of the digital sample as having a second pulse width that is at least 4X. The interface circuit further includes means for converting the N bits of the digital sample to the analog value. Preferably, the first pulse width is equal to or greater than 3X, and the second pulse width is equal to or greater than 5X.

The process apparatus may transmit signals representative of two or more analog signals in parallel on separate lines of the binary interface or may transmit signals representative of the two or more analog signals serially on a single line of the binary interface in a time-multiplexed manner. In this case, the interface circuit includes multiplexing means for sequentially handling the signals and converting the signals to analog values. In the configuration where the process apparatus outputs analog values, the process apparatus includes means for serially transmitting the identification pulse followed by the N bits of the digital sample on a specified output line of the binary interface.

BRIEF DESCRIPTION OF THE DRAWINGS

For a better understanding of the present invention, reference is made to the accompanying drawings which are incorporated herein by reference and in which.

DETAILED DESCRIPTION

Figure 1:
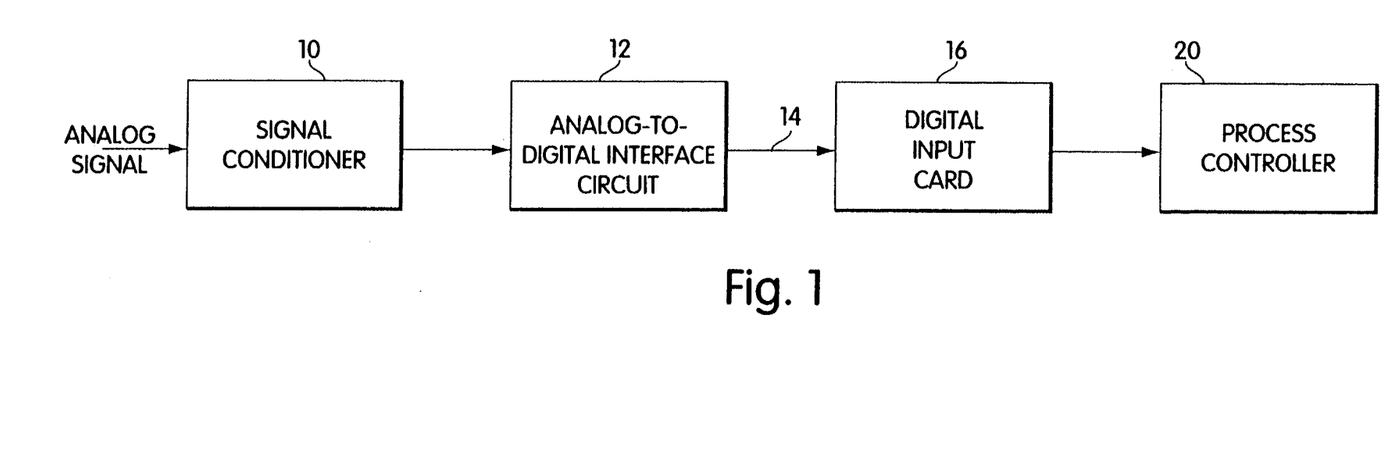
FIG. 1 is a block diagram of a process control system incorporating a single channel interface circuit for inputting an analog signal to a process controller.

A block diagram of a process control system incorporating a first embodiment of the present invention is shown in FIG. 1. An analog signal from a signal source, such as a transducer, is supplied through an optional signal conditioner 10 to an analog-to-digital interface circuit 12. The interface circuit 12 samples the analog signal at a prescribed rate and serially transmits data words on a single line 14 to a digital input card 16. Each data word transmitted by the interface circuit includes an identification (ID) pulse and a digital sample of N bits, and may include additional information such as a sign bit and an overrange bit. The N bits of the digital sample represent a sample value of the analog signal. The digital input card 16 forwards a stream of data words representative of the analog signal to a process controller 20. The transmission from the interface circuit 12 to the process controller is completely asynchronous in that these circuits run on separate clocks. Furthermore, process controller 20 does not acknowledge receipt of the data words from the interface circuit 12.

The input analog signal is typically received from a transducer such as a resistance thermal detector (RTD), a thermocouple temperature sensor, a vibration transducer, a fluid level transducer, a flow transducer, a pressure transducer, a pH transducer, a conductivity transducer, a power level transducer, a humidity transducer, a speed transducer, a position transducer, or any other transducer. In general, the analog signal can be obtained from any analog source.

The interface circuit 12 is capable of serially transmitting data words to the process controller 20 at high speed. However, the interface circuit 12 may be limited to slower data transmission rates, and may thus be limited to slowly-varying analog signals, because of limitations in the process controller 20. More specifically, the data transmission rate is limited by the maximum scan time of the process controller 20. The scan time defines the intervals at which the process controller senses the binary value present on a specified input line and is a function of the software being executed by the process controller.

The signal conditioner 10 permits the interface circuit 12 to accommodate a variety of input analog signals. The signal conditioner 10 may convert the voltage range and impedance of the input analog signal to values that are compatible with the interface circuit 12. For example, the input analog signal may require scaling, level shifting and/or filtering. Nonlinear signals, such as thermocouple signals and RTD signals, may require linearization. As described below, the interface circuit 12 may perform linearization. The signal conditioner 10 may not be required, when the analog signal from the transducer is compatible with the input to the interface circuit 12. Details of the signal conditioner 10 are outside the scope of the present invention and will not be described further.

The digital input card 16 is typically used for inputting binary signals to the process controller 20. Examples of such inputs include switch closures, limit sensor outputs, and the like, which are in one of two states. A typical digital input card 16 may include 16 input lines. However, the present invention requires only one input line per analog signal. In some cases, digital samples representative of two or more analog signals may be transmitted serially on a single input line in a time-multiplexed manner.

The process controller 20 typically includes a microprocessor which performs all necessary operations in the process control system. Examples of process controllers include Models PLC5 and SLC500, available from Allen Bradley. The process controller 20 receives inputs from the digital input card 16 at intervals that depend on the software being executed by the process controller 20. The process controller 20 scans the inputs from the digital input card 16 at intervals known as the scan time and processes the inputs as required. The scan time typically has a value on the order of about 10 milliseconds, but in some cases may be longer depending on the software being executed by the process controller 20. Binary inputs supplied to the process controller 20 through digital input card 16 must be present for a sufficient time to insure recognition by the process controller 20, with an acceptable error rate. In cases where the scan time is excessively long, it may be necessary to use the selectable time interrupt available in some process controllers in order to receive inputs from the interface circuit 12 more frequently. As described below, the timing parameters of the data words transmitted from the interface circuit 12 to the process controller 20 are selected for compatibility with the average scan time of the process controller.

Process controller 20 includes a software routine for scanning the specified input line of the digital input card 16 at a rate determined by the scan time, and for recognizing and handling each of the data words received from the interface circuit 12. The software routine recognizes the identification pulse as the start of a data word and reads the following N bits of the digital sample. Typically, the bits of the digital sample are assembled in a register and then loaded into memory for processing by other routines in the process controller 20. The software routine is described in detail below.

Figure 2:
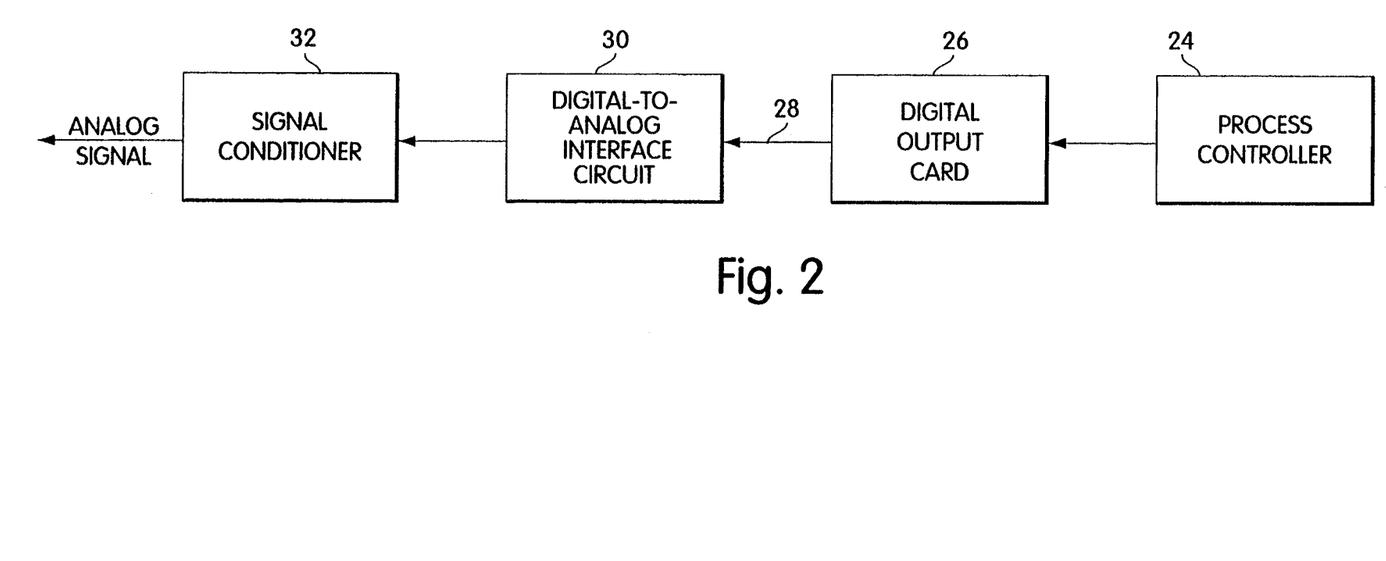
FIG. 2 is a block diagram of a process control system incorporating a single channel interface circuit for outputting an analog signal from a process controller.

A block diagram of a process control system incorporating a second embodiment of the present invention is shown at FIG. 2. In the embodiment of FIG. 2, a process controller 24 outputs an analog signal through a digital output card 26 or other binary interface. The process controller 24 forwards a stream of data words to the digital output card 26. Each data word includes a digital sample of N bits representative of a value of an analog signal, and an identification pulse. The process controller 24 includes a software routine for transmitting the stream of data words on a specified line of the digital output card 26 with specified timing parameters. The data words are transmitted serially on a single line 28 to a digital-to-analog interface circuit 30. The interface circuit 30 recognizes the identification pulse and converts the N bits of the digital sample to an analog value. The analog values are supplied to a signal conditioner 32 which may include scaling, level shifting and/or filtering of the signal. The signal conditioner 32 supplies an analog output signal for control of a process.

Figure 3:
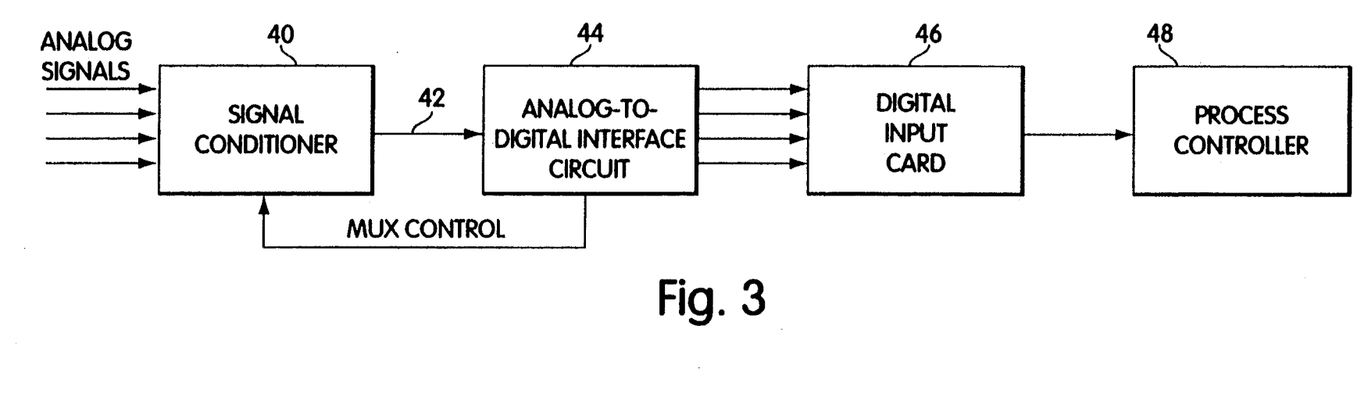
FIG. 3 is a block diagram of a process control system incorporating a four channel interface circuit for inputting analog signals to a process controller.

A block diagram of a process control system incorporating a third embodiment of the present invention is shown in FIG. 3. The embodiment of FIG. 3 is similar to the embodiment of FIG. 1, but includes two or more channels for inputting analog signals to a process controller through a digital input card. A four channel system is illustrated in the example of FIG. 3. Four analog signals are input to a signal conditioner 40 which performs scaling, level shifting and/or filtering of each input analog signal. In addition, the signal conditioner 40 includes an analog multiplexer which sequentially outputs the four analog input signals on a line 42 to an analog-to-digital interface circuit 44. The interface circuit 44 supplies a multiplexer control signal to the signal conditioner 40 for sequentially selecting the analog signals. The interface circuit 44 sequentially samples each analog input signal. The digital samples of the analog signals are temporarily stored by the interface circuit. The interface circuit 44 has four outputs, one corresponding to each of the analog input signals. Each output of the interface circuit 44 is a stream of data words, each including an identification pulse and one of the stored digital samples. The data words may be transmitted on separate lines, one corresponding to each analog signal, of a digital input card 46 to a process controller 48. The process controller 48 scans the input lines of the digital input card 46 and receives the data words representative of the corresponding analog input signals. The process controller 48 includes a software routine, as described below, for recognizing the identification pulse and handling the digital sample which follows the identification pulse.

In a variation of the embodiment shown in FIG. 3, data words representative of two or more analog signals may be transmitted serially by the interface circuit 44 to the process controller 48 on a single line of the digital input card 46 in a time-multiplexed manner. In this case, a data word representative of one analog signal is followed by a data word representative of a second analog signal, and so on. As more analog signals are time-multiplexed on a single line, the update time for each analog signals is increased.

Figure 4:
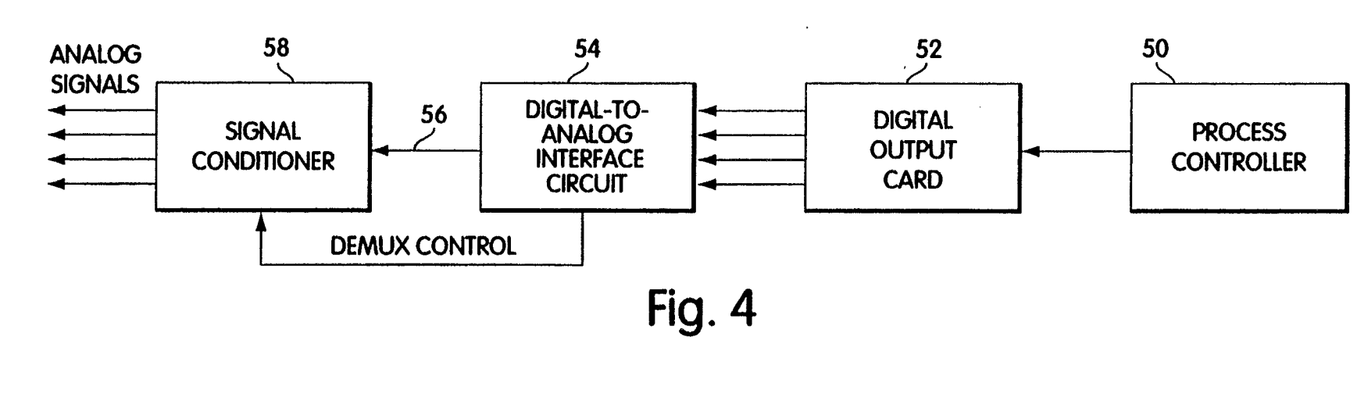
FIG. 4 is a block diagram of a process control system incorporating a four channel interface circuit for outputting analog signals from a process controller.

A block diagram of a process control system incorporating a fourth embodiment of the present invention is shown in FIG. 4. The embodiment of FIG. 4 is similar to the control system of FIG. 2, but includes two or more channels for outputting analog signals from a process controller 50 through a digital output card 52. A four channel system is illustrated in the example of FIG. 4. The process controller 50 may transmit a stream of data words on each of four output lines of the digital output card 52. Each data word includes an identification pulse and a digital sample of N bits representative of a value of an analog signal. The data words are input to a digital-to-analog interface circuit 54 which recognizes each identification pulse and temporarily stores the associated digital sample. The digital samples are converted by the interface circuit 54 to analog values representative of four analog signals. The analog values are supplied in a time multiplexed manner on a line 56 to a signal conditioner 58. The signal conditioner 58 includes a sample-and-hold circuit for each analog signal for storing the analog value of the corresponding analog signal. The analog values on line 56 are supplied to the corresponding sample-and-hold circuit under control of a demultiplex signal from interface circuit 54. The signal conditioner 58 also includes circuitry for scaling, level shifting and/or filtering of each analog output signal. In a variation of the embodiment shown in FIG. 4, data words representative of two or more analog signals may be transmitted serially by the process controller 50 to the interface circuit 54 on a single line of the digital output card 52.

The process control systems shown in FIGS. 1–4 and described above have several common features. In each case, digitized values of analog signals are input to a process controller or output from a process controller as a stream of data words. Each data word includes an identification pulse and a digital sample of N bits. As described below, the transmitted values may also include a sign bit and an overrange bit. The identification pulse and the N bits of the digital sample are transmitted through a digital input or output card that is normally intended for receiving or transmitting binary signals, such as switch closures, lamp control signals and the like. In each case, the interface circuit and the process controller operate asynchronously. The identification pulse permits the following digital sample to be recognized, without transmission of synchronizing signals, acknowledgments or the like. As described below, the timing of the identification pulse and the bits of the digital sample is selected for compatibility with the maximum scan time of the process controller.

The process control systems shown in FIGS. 1–4 and described above utilize a digital input card for input of binary information and a digital output card for output of binary information. Some process controllers simply have input/output terminals for inputting and outputting binary information. Each of the input/output cards and the input/output terminals functions as a binary interface for transfer of binary information to or from the process controller. The present invention can be utilized with any process controller that has a binary interface for transfer of binary information to or from the process controller. Furthermore, the present invention is not limited to use with process controllers. More generally, the present invention may be utilized with any process apparatus, including process controllers and process monitors. Finally, the multiple channel embodiments shown in FIGS. 3 and 4 can have any desired number of channels.

Figure 5:
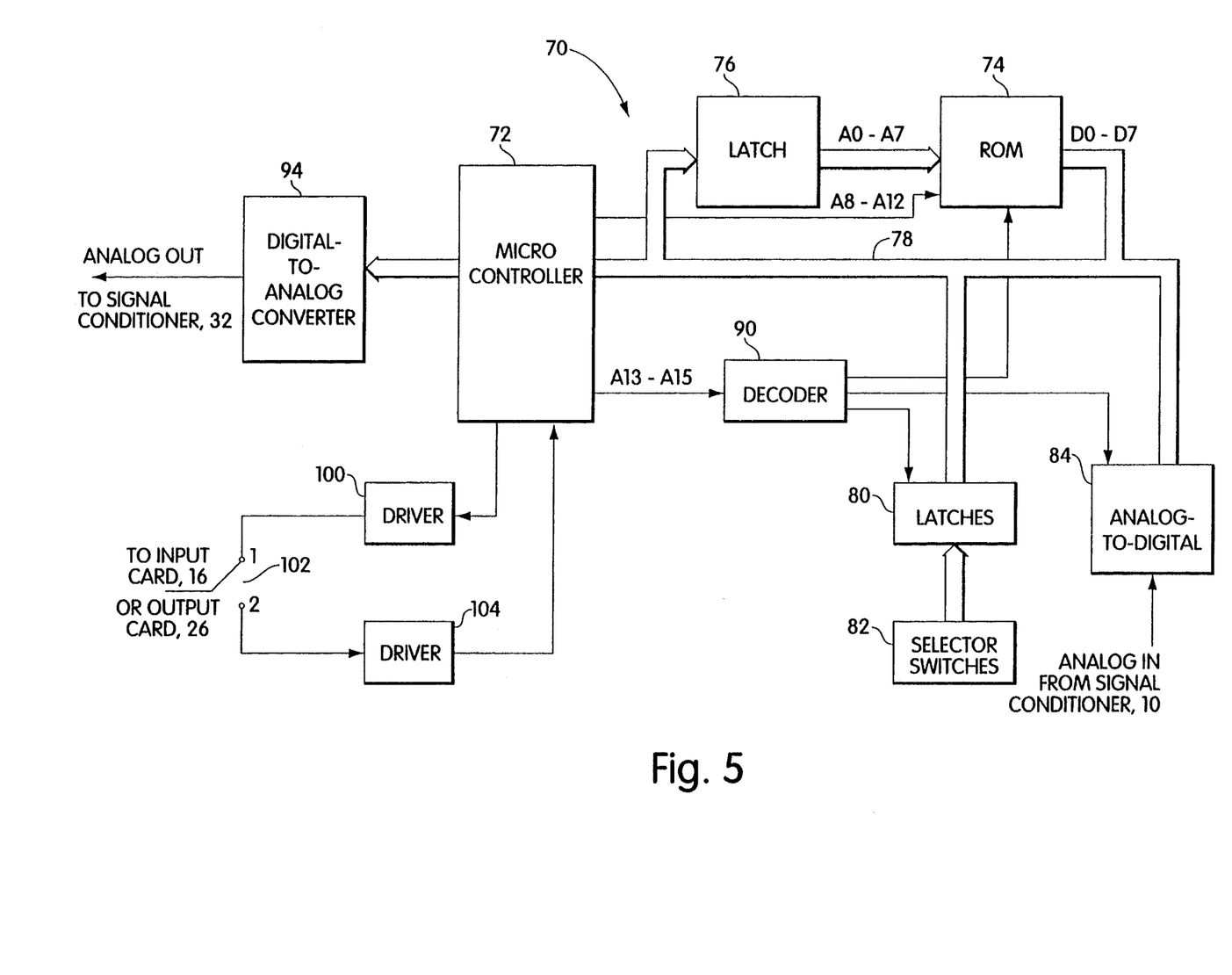
FIG. 5 is a block diagram of a single channel interface circuit in accordance with the present invention.

A block diagram of a suitable implementation of the single channel interface circuit is shown in FIG. 5. The interface circuit of FIG. 5 can be used to implement both the analog digital interface 12 shown in FIG. 1 and the digital-to-analog interface circuit 30 shown in FIG. 2, with the modifications described below. A processor 70 for controlling operations of the interface circuit includes a microcontroller 72, a read only memory (ROM) 74 and an address latch 76. In a preferred embodiment, the microcontroller 72 comprises an Intel 8032 microcontroller, and the ROM 74 contains 8K bytes for storage of the interface circuit program. An address and data bus 78 of microcontroller 72 is connected to the input of latch 76 and to the output of ROM 74. The ROM 74 receives upper order address bits directly from microcontroller 72 and lower order address bits from latch 76. The data outputs of ROM 74 are supplied on bus 78 to the microcontroller 72.

Also connected to bus 78 are latches 80, which receive inputs from selector switches 82. The selector switches 82 permit user selection of the timing parameters of the data word. In addition, the selector switches 82 permit identification of transducer type and selection of any other desired parameters.

An analog-to-digital converter 84 is utilized when the interface circuit is configured to input digital samples of an analog signal to the process controller. The analog-to-digital converter 84 receives an analog input signal from the signal conditioner 10 (FIG. 1) and has its data outputs connected to bus 78. The analog-to-digital converter 84 can, for example, be a type 7109 manufactured by Teledyne. A decoder 90 receives upper address bits from microcontroller 72 and supplies enable signals to ROM 74, latches 80 and analog-to-digital converter 84.

The microcontroller 72 supplies inputs into a digital-to-analog converter 94 on programmed I/O lines of the microcontroller 72. The digital-to-analog converter 94 is utilized only when the interface circuit is configured to receive digital samples of an analog signal from the process controller. The output of digital-to-analog converter 94 is connected to the signal conditioner 32 (FIG. 2).

The microcontroller 72 supplies data words to the digital input card 16 through a driver 100 and a selector switch 102. The microcontroller 72 receives data words from the digital output card 26 through switch 102 and the driver 104. The drivers 102 and 104 are preferably optical isolators. The switch 102 permits the process controller to be selectively connected to driver 100 or driver 104. The process controller is connected through digital input card 16 to driver 100 when the interface circuit is configured to input digital samples of an analog signal to the process controller. The process controller is connected through digital output card 26 to driver 104 when the interface circuit is configured to receive digital samples of an analog signal from the process controller.

When the interface circuit of FIG. 5 is configured to input digital samples to the process controller, the analog-to-digital converter 84 is installed in the circuit, and the switch 102 is placed in position 1 to connect the output of driver 100 to the digital input card 16. The interface circuit transmits a stream of data words, including identification pulses followed by digital samples, to the process controller at a rate determined by the selector switches. When the interface circuit is configured to receive digital samples from the process controller, the digital-to-analog converter 94 is installed in the circuit, and the switch 102 is placed in position 2 to connect the input of driver 104 to the digital output card 26. The interface circuit receives a stream of data words at a rate determined by the process controller. The selector switches 82 are set to match the data rate of the data words received from the process controller.

The firmware in ROM 74 for controlling the operation of the interface circuit includes three primary functions. An initialization routine reads the value of the selector switches 82 and establishes the required timing and other variable parameters. A data acquisition and value manipulation routine controls the analog-to-digital convertor 84, stores the output of the analog-to-digital convertor 84, and linearizes the analog signal if necessary. When the interface circuit of FIG. 5 is configured to input digital samples to the process controller, a data transmission routine controls serial transmission of the stored data words to the process controller, with the timing established by the selector switches 82. When the interface circuit is configured to receive digital samples from the process controller, a data input routine recognizes the identification pulse and each data bit, and stores the received data. These software routines are described in detail below.

Figure 6:
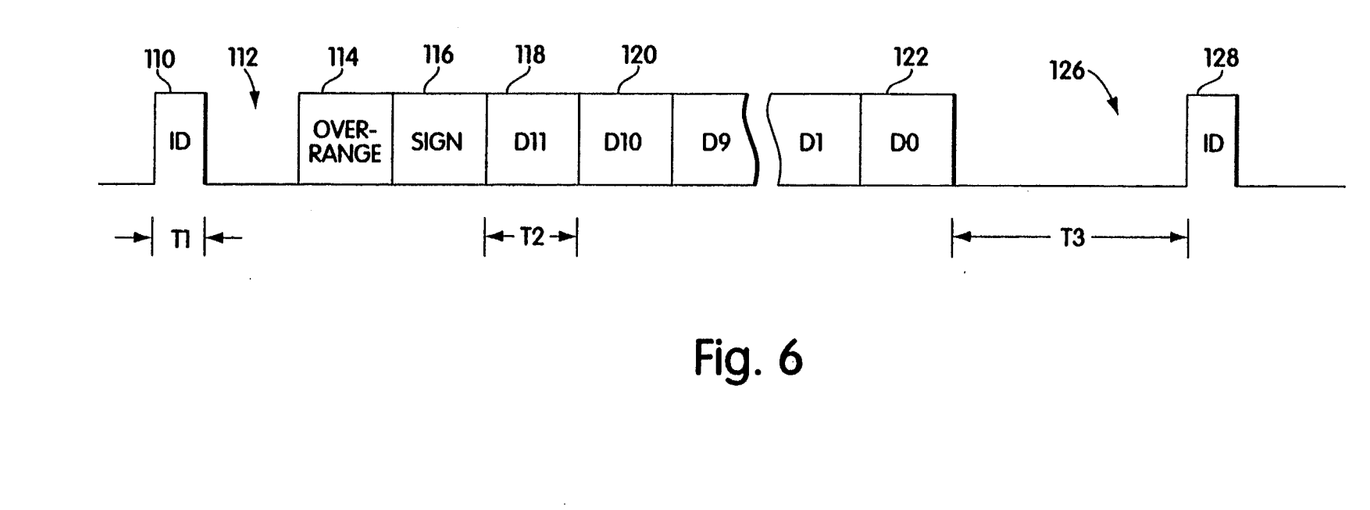
FIG. 6 is a timing diagram showing the format for data transmission in accordance with the present invention.

A timing diagram showing the format of the data words transmitted by the interface circuit or received by the interface circuit is shown in FIG. 6. Each data word includes an identification pulse 110 followed by a zero 112, an optional overrange bit 114, an optional sign bit 116 and 12 data bits 118, 120 . . . 122 of the digital sample. More generally, the digital sample includes N Bits and may include a sign bit and a overrange bit. The last data bit 122 is followed by timeout period 126. The timeout period is terminated by an identification pulse 128 for the next data word. The important timing parameters of the data word are the period T1 of the identification pulse, the period T2 of each data bit and the timeout period T3.

The timing periods T1, T2 and T3 are selected based on the maximum scan time of process controller. The scan time specifies the rate at which the process controller inputs or outputs binary information on a specified interface line. Thus, for example, when the scan time is 10 milliseconds, the process controller reads a specified input line of the digital input card 16 on the average of every 10 milliseconds. The timing periods T1, T2 and T3 are established as follows. The period T1 of the identification pulse is at least two times the scan time. Preferably, the period T1 is three or more times the scan time of the process controller. The period T2 of each of the data bits of the digital sample is longer than the period T1 of the identification pulse by a sufficient amount that the identification pulse can be distinguished from the data bits. This permits the start of a data word to be recognized. The period T2 is at least four times and preferably five or more times the scan time. In a preferred embodiment, the period T1 of the identification pulse is 3X, and the period T2 of each of the data bits is 5X, where X represents the scan time of the process controller. The timeout period T3 establishes the time between data words and may be in a range of 30 milliseconds to 100 milliseconds. The timing period T1, T2 and T3 are established by selector switches 82 (FIG. 5) based on a knowledge of the scan time of the process controller in a particular application. In a typical application, the scan time X is 10 milliseconds, T1 is 30 milliseconds, T2 is 50 milliseconds and T3 is 50 milliseconds, for a total cycle time of 0.86 seconds.

Figure 7:
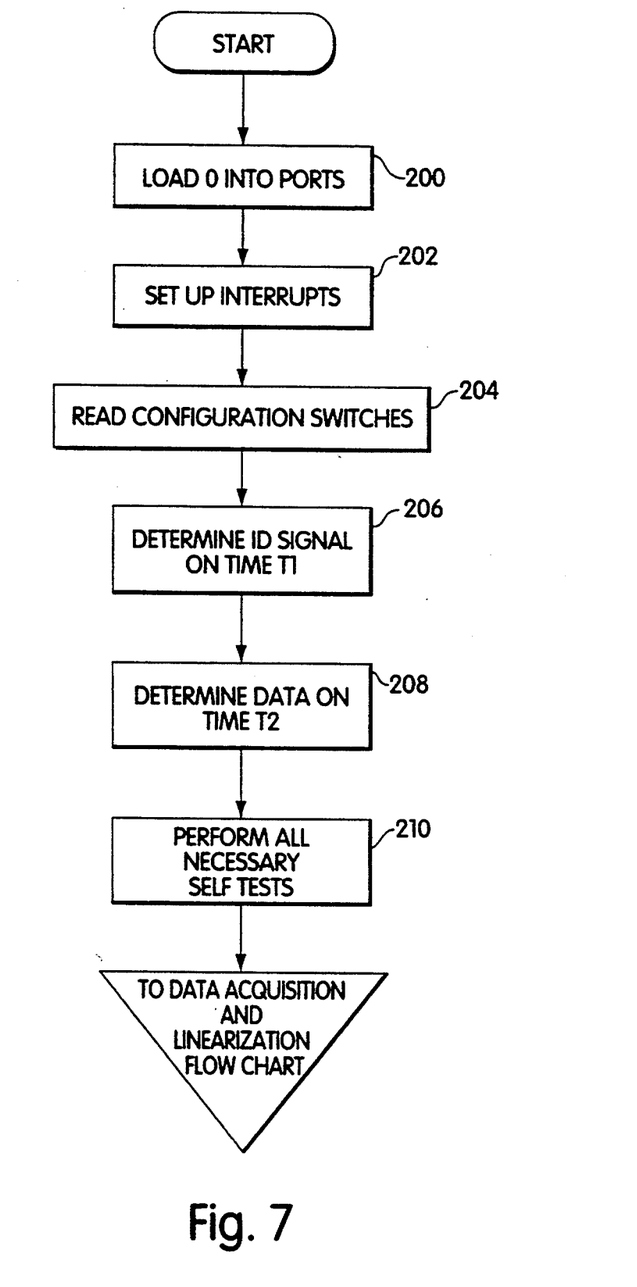
FIG. 7 is a flow diagram that illustrates the initialization routine executed by the microcontroller of FIG. 5.

A flowchart of the initialization routine executed by the microcontroller 72 is illustrated in FIG. 7. After microcontroller initialization steps 200 and 202, the selector switches 82 (FIG. 5) are read in step 204. From the selector switch settings, the period T1 of the identification pulse is determined in step 206, and the period T2 of each bit of the digital sample is determined in step 208. Self tests are performed in step 210.

Figure 8:
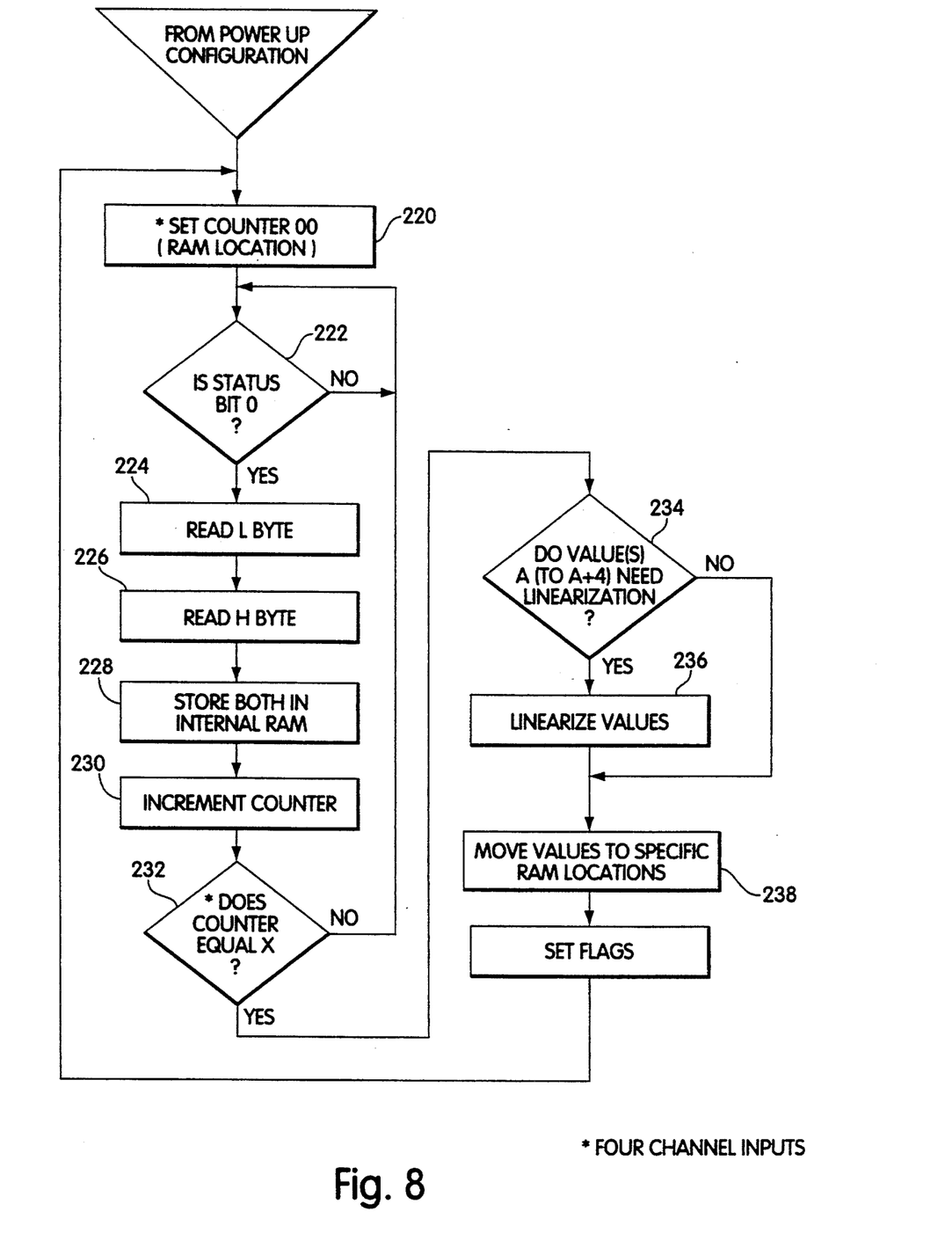
FIG. 8 is a flow diagram that illustrates the data acquisition and value manipulation routine executed by the microcontroller of FIG. 5.

A flowchart of the data acquisition and value manipulation routine executed by the microcontroller 72 is shown in FIG. 8. If the interface circuit has more than one channel, a software channel counter is set in step 220. The counter represents the channel being processed. A status bit indicative of the presence of data in analog-to-digital converter 84 is checked in step 222. When data is present in the analog-to-digital converter 84, the low byte is read in step 224, and the high byte is read in step 226. The high and low bytes from the analog-to-digital converter 84 are stored in the internal RAM of microcontroller 72 in step 228. The channel counter is incremented in step 230. If the channel counter has not reached the number of channels in the system (step 232), steps 222-230 are repeated until values for all channels have been read and stored. If the stored values are determined in step 234 to require linearization, the values are linearized in step 236, and the linearized values are moved to specified RAM locations in step 238.

Figure 9:
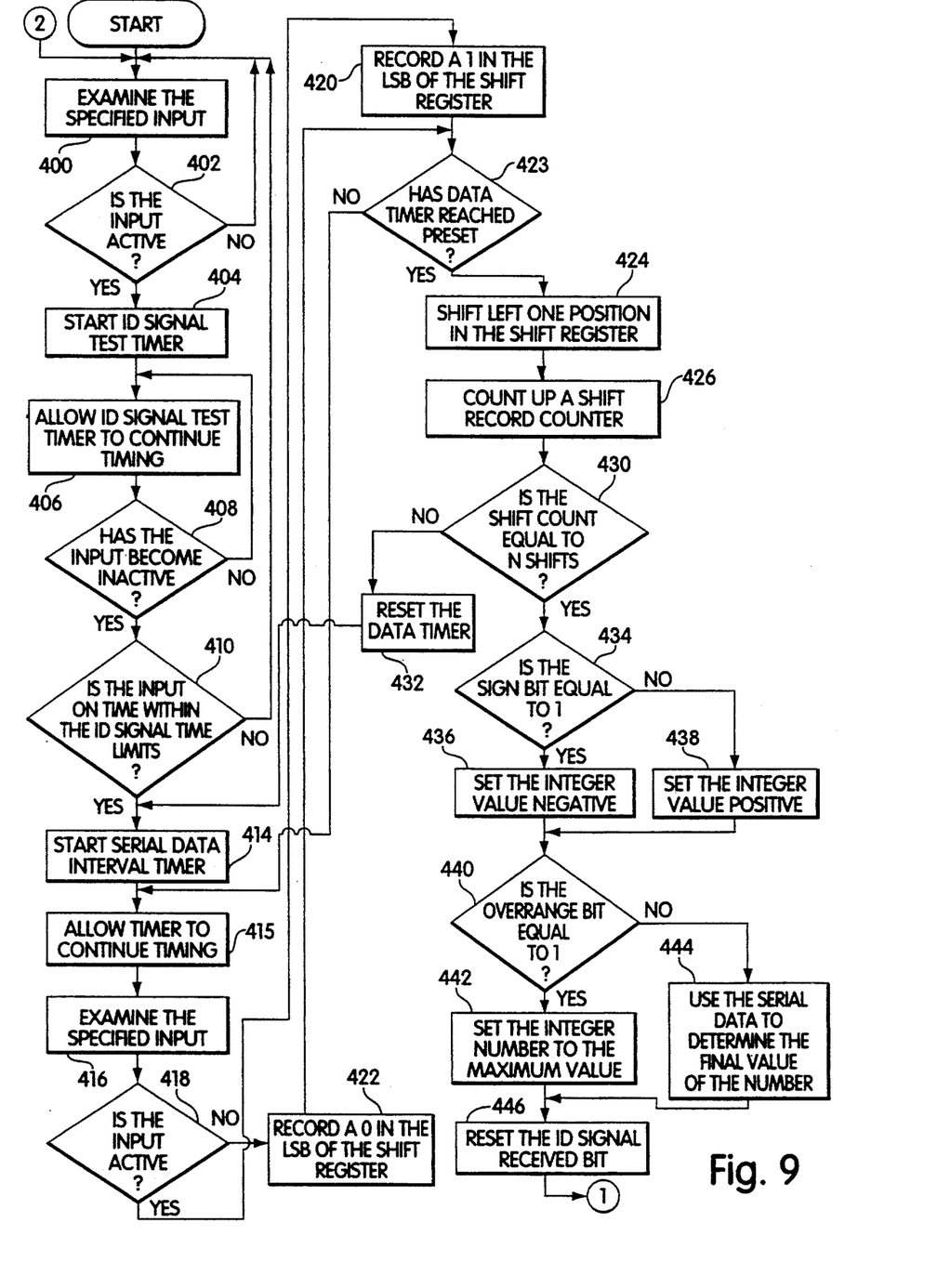
FIG. 9 is a flow diagram that illustrates the routine executed by the process controller for receiving serial data from the interface circuit or executed by microcontroller of FIG. 5 for receiving serial data from the process controller.

A flowchart of the software routine in the process controller 20 for recognizing and handling data words received from the interface circuit is shown in FIG. 9. A similar software routine is executed by the interface circuit when it is configured to receive digital samples from the process controller. In step 400, the specified input line for receiving data words is examined. The routine which begins with step 400 is initiated at intervals corresponding to the scan time of the process controller. If the input is determined to be active in step 402, an identification pulse timer is started in step 404. The timer continues timing in step 406 until the specified input becomes inactive, as determined in step 408.

When the specified input becomes inactive, the timer is stopped, and pulse width of the ID pulse is compared with upper and lower limits in step 410. Typically, the upper limit is the normal ID pulse width plus the scan time, and the lower limit is the normal ID pulse width minus the scan time. Thus, for example, when the normal ID pulse width T1 is 30 milliseconds and the scan time is 10 milliseconds, the process controller recognizes a pulse in the range of 20 milliseconds to 40 milliseconds as an ID pulse. The upper and lower limits for recognizing an ID pulse are required because the start of the ID pulse is asynchronous with the scanning of the specified input line by the process controller. Data bits are not recognized as an ID pulse because they have a pulse width that is greater than the upper limit for an ID pulse. When the ID pulse is not within the specified time limits, as determined in step 410, the routine is reset and any following data bits are ignored.

Assuming that the ID pulse is within specified time limits, a data timer is started in step 414, the data timer is allowed to continue timing in step 415 and the specified input is examined in step 416. When the input is determined to be active in step 418, a one is recorded in the least significant bit of a shift register in step 420. When the input is not active, a zero is recorded in the least significant bit of the shift register in step 422. The data timer is compared with the preset value in step 423. When the data timer has not reached the preset value, the routine returns to step 415 and allows the timer to continue timing. When the data timer has reached the preset value, the active position in the shift register is shifted left by one position in step 424, and a shift record counter is incremented in step 426.

When the shift count is determined in step 430 to be less than N, the data timer is reset in step 432 and the recording of data bits is repeated until the N bits of the digital sample have been received. When the shift count reaches N, a sign bit is tested in step 434 and the sign of the digital sample is set appropriately in step 436 or 438. The overrange bit is tested in step 440. When the overrange bit is set, the integer value of the digital sample is set to the maximum value in step 442. When the overrange bit is not set, the N bits stored in the shift register are established as the integer value of the digital sample in step 444. The ID pulse received bit is reset in step 446.

Figure 10:
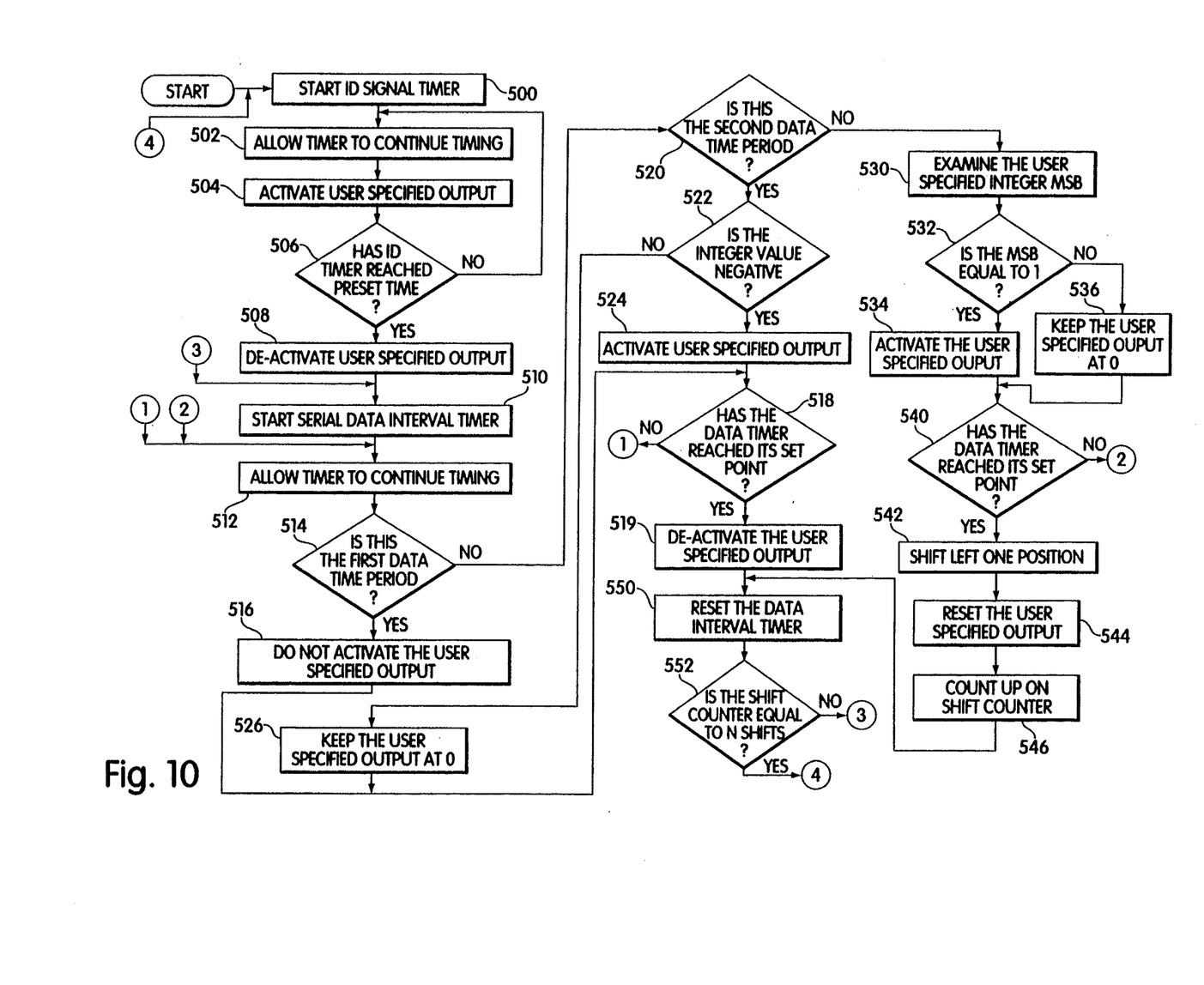
FIG. 10 is a flow diagram that illustrates the routine executed by the microcontroller of FIG. 5 for transmitting serial data to the process controller or executed by the process controller for transmitting serial data to the interface circuit.

A flowchart of the routine executed by the process controller 24 (FIG. 2) for transmitting data words through the binary interface to the interface circuit 54 is shown in FIG. 10. A similar software routine is executed by the interface circuit when it is configured to transmit digital samples to the process controller. An ID pulse timer is started in step 500. The timer continues timing in step 502, and the specified output for transmission of the data word is activated in step 504, until the ID pulse timer has reached a preset time T1, as determined in step 506. After the ID pulse timer has timed out, the specified output is deactivated in step 508, thus terminating the ID pulse. A serial data timer is started in step 510. When the data time period is determined in step 514 to be the first data time period, the specified output is held inactive in step 516 until the data timer has expired, as determined in step 518. This corresponds to the zero 112 shown in FIG. 6. When the data timer has expired, the specified output is deactivated in step 519, the data timer is reset in step 550 and the shift counter is tested in step 552.

During the second data time period as determined in step 520, the sign of the digital sample is determined in step 522. When the sign is negative, the specified output is activated in step 524 until the data timer has expired as determined in step 518. When the sign of the digital sample is positive, the specified output is held at zero in step 526. When the data timer has expired, the specified output is deactivated in step 519, the data timer is reset in step 550 and the shift counter is tested in step 552.

In the third data time period, the most significant bit of the digital sample is examined in step 530. When the most significant bit is equal to one, as determined in step 532, the specified output is activated in step 534. When the most significant bit is a zero, the specified output is held at zero in step 536. When the data timer has expired as determined in step 540, the position in the register holding the digital sample is shifted left one position in step 542, and the specified output is reset in step 544. A shift counter is incremented in step 546, and the data timer is reset in step 550. When the shift counter has not reached a value of N, as determined in step 552, the transmission process is repeated for each of the N bits of the digital sample.

When the interface circuit is configured for transmitting two or more analog signals to the process controller or for receiving two or more analog signals from the process controller, the circuit shown in FIG. 5 is modified by adding drivers 100 and 102 for each channel and additional selector switches 82 for setting the parameters for each channel. In addition, the microcontroller 72 provides control signals for selecting the channel being processed. In the input configuration, the analog signal for the selected channel is supplied to the analog-to-digital converter 84. In the output configuration, the output of the digital-to-analog converter 94 is supplied to the selected channel of the signal conditioner, and each channel of the signal conditioner includes a sample-and-hold circuit. Finally, in the output configuration, the digital-to-analog converter 94 is written to as if it was external RAM on the bus 78, rather than connecting the digital-to-analog converter 94 to I/O ports of the microcontroller 72.

Figure 11:
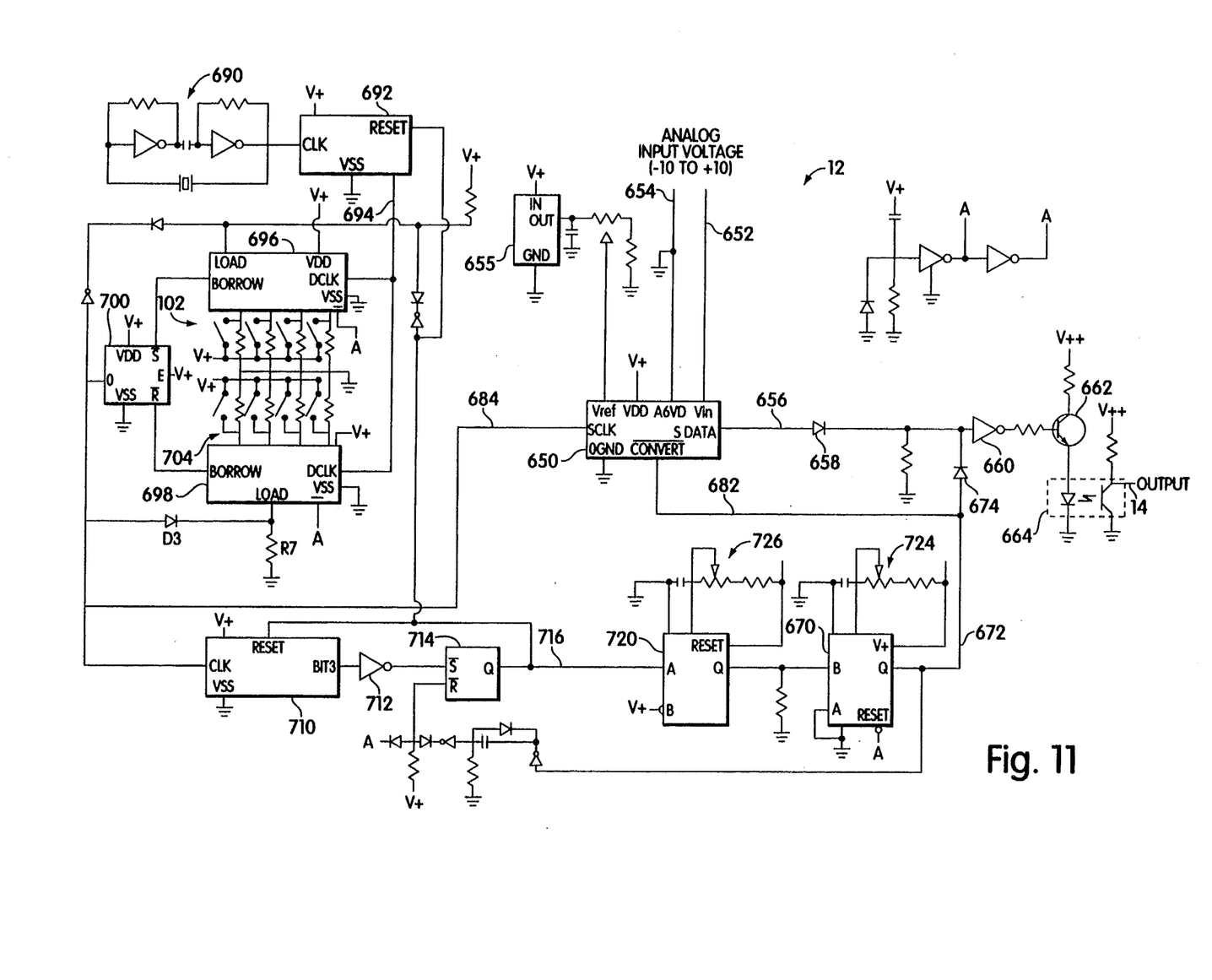
FIG. 11 is a schematic diagram of an alternate embodiment of the single channel interface circuit.

An alternate implementation of the analog-to-digital interface circuit 12 is shown in FIG. 11. A major component of the circuit is an analog-to-digital converter 650 which converts an analog signal applied between an analog input 652 and an analog ground 654 to a digital sample. A reference source 655 generates a reference voltage for the analog-to-digital converter 650. The digital sample is transmitted serially on an output 656. The analog-to-digital converter 650 can, for example, be a 12-bit ADC, type AD7893 manufactured by Analog Devices, Inc. The serial data output from analog-to-digital converter 650 on output 656 is supplied through a diode 658 to an output circuit including an inverter 660, a driver transistor 662 and an optical isolator 664. The output of optical isolator 664 on output line 14 is supplied to digital input card 16 (FIG. 1). In the example given above, the serial data output includes 16 bits, with 4 leading zeros followed by 12 bits of conversion data.

The output of the interface circuit 12 also includes an identification pulse. The identification pulse is generated by a one shot pulse generator 670. As shown in FIG. 6, the identification pulse 110 has a period T1. The identification pulse from pulse generator 670 is supplied on a line 672 through a diode 674 to the output interface circuit. The identification pulse is also supplied on a line 682 to the convert input of analog-to-digital converter 650. When the convert input is asserted, the analog-to-digital converter 650 samples the analog input and converts the sampled analog value to a digital sample. The digital sample is clocked out of the analog-to-digital converter 650 by a clock signal on a line 684. Each bit of the serially transmitted digital sample has a period T2, as shown in FIG. 6. In the embodiment of FIG. 11, the data word does not include an overrange bit or a sign bit.

A crystal oscillator 690 generates a clock signal at a frequency of 32 Kilohertz. The output of oscillator 690 is applied to a counter 692. The counter 692 divides the clock output by 32 and supplies a one Kilohertz time base on a line 694 to a timing circuit which includes counters 696 and 698 and a flip-flop 700. Switches 702 and 704 are connected to the preload inputs of counters 696 and 698, respectively. By appropriate selection of the switches 702 and 704, an output clock from flip-flop 700 has a clock period between 1 and 50 milliseconds. The output of flip-flop 700 is supplied on line 684 to the serial clock input of analog-to-digital converter 650 and to the clock input of a counter 710. The counter 710, after 16 input clock pulses, supplies an output through an inverter 712 to set a flip-flop 714. An output of flip-flop 714 on a line 716 resets counters 692 and 710 and triggers a one shot pulse generator 720. The output of flip-flop 714 indicates that 16 clock pulses have been supplied to the analog-to-digital converter 650, thereby insuring that all 12 bits of the digital sample have been transmitted to the digital input card 16.

The pulse generator 720 establishes the timeout period T3 between transmissions of data words. The output of pulse generator 720 is supplied to the input of pulse generator 670. At the end of the timeout period, the pulse generator 670 is triggered to generate another identification pulse, thereby initiating a cycle as described above, including conversion of the analog input to a digital sample and transmission of the identification pulse and the digital sample to the digital input card 16. The cycle includes the identification pulse followed by four leading zeros and 12 bits of data, then followed by the timeout period. The cycle is repeated continuously.

The period T1 of the identification pulse 80 is adjustable in a range of about 1 millisecond to 300 millisecond by adjusting the RC time constant 724 of pulse generator 670. The duration T2 of each bit of the digital sample is adjustable by selection of switches 702 and 704. The duration of the timeout period T3 between conversion cycles is adjustable by varying the RC time constant 726 of pulse generator 720. The timing values T1, T2 and T3 are adjusted for compatibility with the process controller 20 as described above.

The transmission of data from the interface circuit to the process controller, or from the process controller to the interface circuit, uses no handshaking or error correction techniques to transmit and receive data. The interface circuit and the process controller run completely asynchronously, with no feedback of any kind transmitted from the process controller to the interface circuit to confirm reception of data. The identification pulse is recognized by the process controller because its pulse duration is different from the duration of each of the data bits in the serially transmitted digital sample. As a result, an analog signal can be transmitted to the process controller through a digital input card or other digital interface that is not designed for handling analog signals and is not designed for handling serial data. Similarly, an analog signal can be transmitted from the process controller through a digital output card or other digital interface that is not designed for handling analog signals and is not designed for handling serial data. Thus, the present invention provides a low cost approach to inputting of analog signals to process apparatus and outputting analog signals from process apparatus.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An interface circuit for inputting an analog signal to process apparatus having a binary interface, comprising:

means for converting the analog signal to a digital sample of N bits; and means for serially transmitting to the process apparatus on a single line of the binary interface an identification pulse followed by the N bits of said digital sample, said process apparatus having a scan time X for sampling inputs at said binary interface, said means for transmitting including means for transmitting said identification pulse with a first pulse width that is at least 2X and for transmitting each of the N bits of said digital sample with a second pulse width that is at least 4X.

2. An interface circuit as defined in claim 1 wherein said first pulse width is equal to or greater than 3X, and said second pulse width is equal to or greater than 5X.

3. An interface circuit as defined in claim 1 wherein said second pulse width is 2X or more greater than said first pulse width.

4. An interface circuit as defined in claim 2 wherein said means for converting comprises an analog-to-digital converter and wherein said means for serially transmitting comprises a microcontroller for temporarily storing the N bits of said digital sample.

5. An interface circuit as defined in claim 4 further including multiplexing means for sequentially supplying two or more analog signals to said analog-to-digital converter, wherein said microcontroller includes means for temporarily storing digital samples representative of samples of said two or more analog signals and for transmitting said digital samples in parallel on separate lines of said binary interface.

6. An interface circuit as defined in claim 1 further including means for selecting said first pulse width and said second pulse width.

7. A system comprising:
process apparatus including a binary interface and means for sampling inputs at said binary interface with a scan time X; and
an interface circuit including means for converting an analog signal to a digital sample of N bits; and means for serially transmitting to the process apparatus on a single line of the binary interface an identification pulse followed by the N bits of said digital sample, said means for transmitting including means for transmitting said identification pulse with a first pulse width that is at least 2X and for transmitting each of the N bits of said digital sample with a second pulse width that is at least 4X, said process apparatus including means responsive to said identification pulse for recognizing the N bits of said digital sample.

8. A system as defined in claim 7 wherein said first pulse width is equal to or greater than 3X, and said second pulse width is equal to or greater than 5X.

9. A system as defined in claim 8 wherein said means for converting comprises an analog-to-digital converter and wherein said means for serially transmitting comprises a microcontroller for temporarily storing the N bits of said digital sample.

10. A system as defined in claim 9 further including multiplexing means for sequentially supplying two or more analog signals to said analog-to-digital converter, wherein said microcontroller includes means for temporarily storing digital samples representative of samples of said two or more analog signals and for transmitting said digital samples in parallel on separate lines of said binary interface.

11. A system as defined in claim 8 wherein said process apparatus further includes means for recognizing said identification pulse and the N bits of said digital sample.

12. A system as defined in claim 8 wherein said means for recognizing includes means for determining the time duration of said identification pulse and for establishing the presence of said identification pulse when the time duration of said identification pulse is within predetermined upper and lower limits.

13. An interface circuit for conversion of a signal transmitted serially by process apparatus having a binary interface, said signal including an identification pulse followed by a digital sample of N bits representative of an analog value, said process apparatus having a scan time X for changing output values at said binary interface, said interface circuit comprising:
means for receiving said identification pulse followed by said digital sample of N bits, said means for receiving including means for recognizing said identification pulse as having a first pulse width that is at least 2X and for recognizing each of the N bits of said digital sample as having a second pulse width that is at least 4X; and
means for converting the N bits of said digital sample to said analog value.

14. An interface circuit as defined in claim 13 wherein said first pulse width is equal to or greater than 3X, and said second pulse width is equal to or greater than 5X.

15. An interface circuit as defined in claim 14 wherein said means for receiving comprises a microcontroller responsive to said identification pulse for recognizing and storing the N bits of said digital sample and wherein said means for converting comprises a digital-to-analog converter.

16. A system comprising:
process apparatus including a binary interface and means for outputting binary values at said binary interface with a scan time X, said process apparatus including means for serially transmitting on a single line of said binary interface an identification pulse followed by a digital sample of N bits representative of an analog value; and
an interface circuit including means for serially receiving from the process apparatus said identification pulse followed by said digital sample of N bits, said means for receiving including means for recognizing said identification pulse as having a first pulse width that is at least 2X and for recognizing each of the N bits of said digital sample as having a second pulse width that is at least 4X; and means for converting the N bits of said digital sample to said analog value.

17. A system as defined in claim 16 wherein said first pulse width is equal to or greater than 3X, and said second pulse width is equal to or greater than 5X.

18. A system as defined in claim 17 wherein said means for serially receiving comprises a microcontroller responsive to said identification pulse for recognizing and storing the N bits of said digital sample and wherein said means for converting comprises a digital-to-analog converter.

19. A method for inputting an analog signal to process apparatus having a binary interface, comprising the steps of:
determining a scan time X of said process apparatus for sampling inputs at said binary interface;
converting the analog signal to a digital sample of N bits; and serially transmitting to the process apparatus on a single line of the binary interface an identification pulse followed by the N bits of said digital sample, including transmitting said identification pulse with a first pulse width that is at least 2X and transmitting each of the N bits of said digital sample with a second pulse width that is at least 4X.

20. A method as defined in claim 19 including transmitting said identification pulse with said first pulse width that is equal to or greater than 3X and transmitting each of the N bits of said digital sample with said second pulse width that is equal to or greater than 5X.

21. A method as defined in claim 20 further including said process apparatus recognizing said identification pulse and the N bits of said digital sample.

22. A method as defined in claim 21 wherein the step of recognizing said identification pulse includes determining the time duration of said identification pulse and establishing the presence of said identification pulse when the time duration of said identification pulse is within predetermined upper and lower limits.

23. A method for outputting an analog signal from a process apparatus having a binary interface, comprising the steps of:

determining a scan time X for changing output values at the binary interface of said process apparatus;

serially transmitting a signal from the process apparatus to an interface circuit, said signal including an identification pulse followed by a digital sample of N bits representative of an analog value;

said interface circuit receiving said identification pulse followed by said digital sample of N bits including recognizing said identification pulse as having a first pulse width that is at least 2X and recognizing each of the N bits of said digital sample as having a second pulse width that is at least 4X; and said interface circuit converting the N bits of said digital sample to said analog value.

24. A method as defined in claim 23 including recognizing said identification pulse as having said first pulse width that is equal to or greater than 3X and recognizing each of the N bits of said digital sample as having said second pulse width that is equal to or greater than 5X.

* * * * *